(12) United States Patent
Zarek et al.

(10) Patent No.: US 6,757,159 B2
(45) Date of Patent: Jun. 29, 2004

(54) LAPTOP COMPUTER BASE

(75) Inventors: Lynne Zarek, Boise, ID (US); Paul T. Parker, Kingston, WA (US); John M. Wechkin, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 15 days.

(21) Appl. No.: 10/144,938

(22) Filed: May 13, 2002

(65) Prior Publication Data

US 2002/0126447 A1 Sep. 12, 2002

Related U.S. Application Data

(62) Division of application No. 09/044,689, filed on Mar. 18, 1998, now Pat. No. 6,529,369.

(51) Int. Cl.$^7$ .................................................. G06F 1/16
(52) U.S. Cl. .................... 361/683; 361/680; 248/118.1; D14/458; 345/168; 108/43
(58) Field of Search ............................... 361/683–686; 248/118, 118.1, 346.01, 174, 633, 918; 206/320, 216; D14/458, 100, 114; 108/43

(56) References Cited

U.S. PATENT DOCUMENTS

| | | |
|---|---|---|
| 2,783,109 A | 2/1957 | Frey |
| 3,662,694 A | 5/1972 | Mitchell |
| 3,859,930 A | 1/1975 | Sherwin |
| 4,052,944 A | 10/1977 | Jennings |
| 4,765,583 A | 8/1988 | Tenner |
| 4,852,498 A | 8/1989 | Judd |
| 5,021,771 A | 6/1991 | Lachman |
| 5,029,260 A | 7/1991 | Rollason |
| 5,049,863 A | 9/1991 | Oka |
| 5,054,736 A | 10/1991 | Champoux |
| 5,073,050 A | 12/1991 | Andrews |
| 5,081,936 A | 1/1992 | Drieling |
| 5,187,644 A | 2/1993 | Crisan |
| 5,263,423 A | 11/1993 | Anderson |
| 5,281,958 A | 1/1994 | Ashmun et al. |
| 5,355,811 A | 10/1994 | Brewer |
| D356,558 S | 3/1995 | Montgomery et al. |
| 5,397,189 A | 3/1995 | Minogue |
| 5,416,498 A | 5/1995 | Grant |
| 5,416,730 A | 5/1995 | Lookofsky |
| 5,423,227 A | 6/1995 | Polaert et al. |
| 5,428,355 A | 6/1995 | Jondrow et al. |
| 5,466,078 A | 11/1995 | Szmanda et al. |
| 5,502,460 A | 3/1996 | Bowen |
| 5,504,500 A | 4/1996 | Garthwaite et al. |
| 5,519,569 A | 5/1996 | Sellers |
| 5,527,116 A | 6/1996 | Huellemeier et al. |

(List continued on next page.)

Primary Examiner—Lisa Lea-Edmonds
(74) Attorney, Agent, or Firm—Perkins Coie LLP

(57) ABSTRACT

A base for a laptop computer. In one embodiment, the base has an upper surface with a keyboard and a lower surface opposite the upper surface. The lower surface may have two depressions extending from a forward edge to a rear edge of the lower surface. The depressions are configured to engage both the upper and side surfaces of the user's legs in a manner that restricts relative motion between the base and the user's legs. In one embodiment, the depressions may have a rough texture and/or a skid-resistant material to further restrict motion of the base relative to the user's legs. In another embodiment, first and second support members may be movably attached to the base to move from a stowed position to an unstowed position for providing more surface area to engage the user's legs.

32 Claims, 10 Drawing Sheets

U.S. PATENT DOCUMENTS

| | | |
|---|---|---|
| 5,541,593 A | 7/1996 | Arsem |
| 5,564,844 A | 10/1996 | Patterson, Jr. et al. |
| 5,583,744 A | 12/1996 | Oguchi et al. |
| D380,462 S * | 7/1997 | Wilson ................ D14/458 |
| 5,644,338 A | 7/1997 | Bowen |
| 5,645,277 A | 7/1997 | Cheng |
| 5,648,772 A | 7/1997 | Friedrich et al. |
| 5,655,743 A * | 8/1997 | Gillis ................... 248/918 |
| 5,659,307 A | 8/1997 | Karidis et al. |
| 5,662,422 A | 9/1997 | Fort |
| D385,551 S | 10/1997 | Viletto et al. |
| 5,692,815 A | 12/1997 | Murphy |
| 5,726,683 A | 3/1998 | Goldstein et al. |
| 5,732,910 A * | 3/1998 | Martin ................... 248/118 |
| 5,743,666 A | 4/1998 | VanZeeland et al. |
| 5,818,690 A | 10/1998 | Spencer |
| 5,825,612 A | 10/1998 | Aubuchon et al. |
| 5,862,933 A | 1/1999 | Neville |
| 5,871,094 A | 2/1999 | Leibowitz |
| D406,580 S | 3/1999 | Nien |
| 5,886,686 A | 3/1999 | Chen |
| 5,893,540 A | 4/1999 | Scott |
| 5,901,934 A * | 5/1999 | Wilson ................... 248/918 |
| 5,937,765 A * | 8/1999 | Stirling ................... 108/43 |
| 5,951,179 A | 9/1999 | Zarek |
| 5,957,595 A | 9/1999 | Chen |
| 5,971,148 A * | 10/1999 | Jackson ................... 248/918 |
| 6,003,446 A * | 12/1999 | Leibowitz ............... 248/918 |
| 6,147,673 A | 11/2000 | Zarek |
| 6,163,326 A | 12/2000 | Klein et al. |
| 6,205,021 B1 | 3/2001 | Klein et al. |
| 6,353,530 B1 * | 3/2002 | Zarek et al. ............ 361/683 |

* cited by examiner

LAPTOP COMPUTER BASE

CROSS REFERENCE TO RELATED APPLICATION

This application is a divisional of pending U.S. patent application No. 09/044,689, filed on Mar. 18, 1998 now U.S. Pat. No. 6,529,369.

TECHNICAL FIELD

The present invention is directed toward a base for a laptop computer.

BACKGROUND OF THE INVENTION

Laptop computers are portable computers that generally operate from either external or portable power sources. Conventional laptop computers typically have a base pivotally connected to a display housing. The base typically includes a primary input device, such as a keyboard, and a secondary input device, such as a computer mouse, roller ball or touch pad. The display housing typically includes a liquid crystal display (LCD) or other type of display. To access the keyboard and the display, a user positions the base on a surface (e.g., the user's lap or a fixed surface) and opens the computer by pivoting the display housing away from the base. To close and easily transport the computer after use, the user pivots the display housing toward the base and secures the housing to the base.

In conventional laptop computers, the base typically has a small, flat lower surface that rests on the user's legs or another surface when the computer is in use. One drawback with such a conventional laptop computer base is that it may be uncomfortable to use. For example, the small lower surface distributes the weight of the laptop computer over a relatively small area of the user's legs. Furthermore, it may be difficult or awkward to support the computer on the user's lap. For example, to adequately support the computer on the user's lap, the user's legs must be squeezed together to provide a platform for the base. Such a leg position is generally uncomfortable and difficult to maintain for long periods of time. Thus, users are likely to shift either the computer or their legs in a manner that disrupts operation of the computer or increases the likelihood that the computer may fall from their laps.

Another drawback with the conventional laptop base is that it is difficult to balance the base on the user's legs. For example, because the laptop base generally contacts only a small portion of the user's legs, the laptop computer may be easily dislodged from the user's lap. Furthermore, because the base is typically made from a hard, smooth plastic, the laptop computer may slide off the user's lap, and damage the computer and/or data stored on the computer. Such a conventional laptop computer may be particularly likely to slide from the user's lap when it is used in airplanes, buses or other cramped and crowded environments where the computer and/or the user may be jostled.

SUMMARY OF THE INVENTION

The present invention is directed toward laptop computers and bases for laptop computers. In one embodiment, the laptop computer has a base and a display portion coupled to the base to move between a closed position and an open position. The base may have an upper surface with a keyboard and a lower surface opposite the upper surface. The lower surface has a forward edge for facing a user, a rear edge opposite the forward edge, and at least one depression extending between the forward and rear edges. The depression is concave relative to the lower surface to receive at least one of the user's legs when the base is positioned on the user's lap. In a further aspect of the embodiment, the lower surface may have two spaced apart depressions to receive both of the user's legs.

The depressions in the lower surface may have several configurations. For example, in one embodiment, the depressions diverge apart from one another as they extend from the forward edge to the rear edge. In another embodiment, the depressions converge toward one another as they extend from the forward edge to the rear edge. The depressions may be shaped to engage both the upper and side surfaces of the user's legs, and the surface in the cavities of the depressions may have a rough texture, skid-resistant materials, or compressible materials to inhibit slippage between the user's legs and the base.

In yet another embodiment of the invention, the laptop computer includes first and second support members connected to the base. Each support member is movable relative to the base between a stowed position and an unstowed position, and each support member has an engaging surface extending outwardly from the base in the unstowed position to engage one of the user's legs. The engaging surface may be shaped to engage an upper and/or side surface of the user's leg. In one embodiment, the support members are pivotally connected to the base and may be stowed against a lower surface of the base, or against a side surface of the base. In another embodiment, the support members may be partially or completely stowed within an aperture of the base. In still a further embodiment, one or both support members may have an input device in an upper surface opposite the engaging surface.

DETAILED DESCRIPTION OF THE INVENTION

The present invention is directed toward bases for laptop computers. In one embodiment, the base may have a contoured lower surface to fit comfortably on a user's lap. In another embodiment, the base may have movable support members that allow users to position their legs in ergonomic sitting positions while still supporting the laptop computer. Many specific details of certain embodiments of the invention are set forth in the following description and in FIGS. 1–11 to provide a thorough understanding of such embodiments. One skilled in the art, however, will understand that the present invention may have additional embodiments and may be practiced without several of the details described in the following description.

Figure 1:
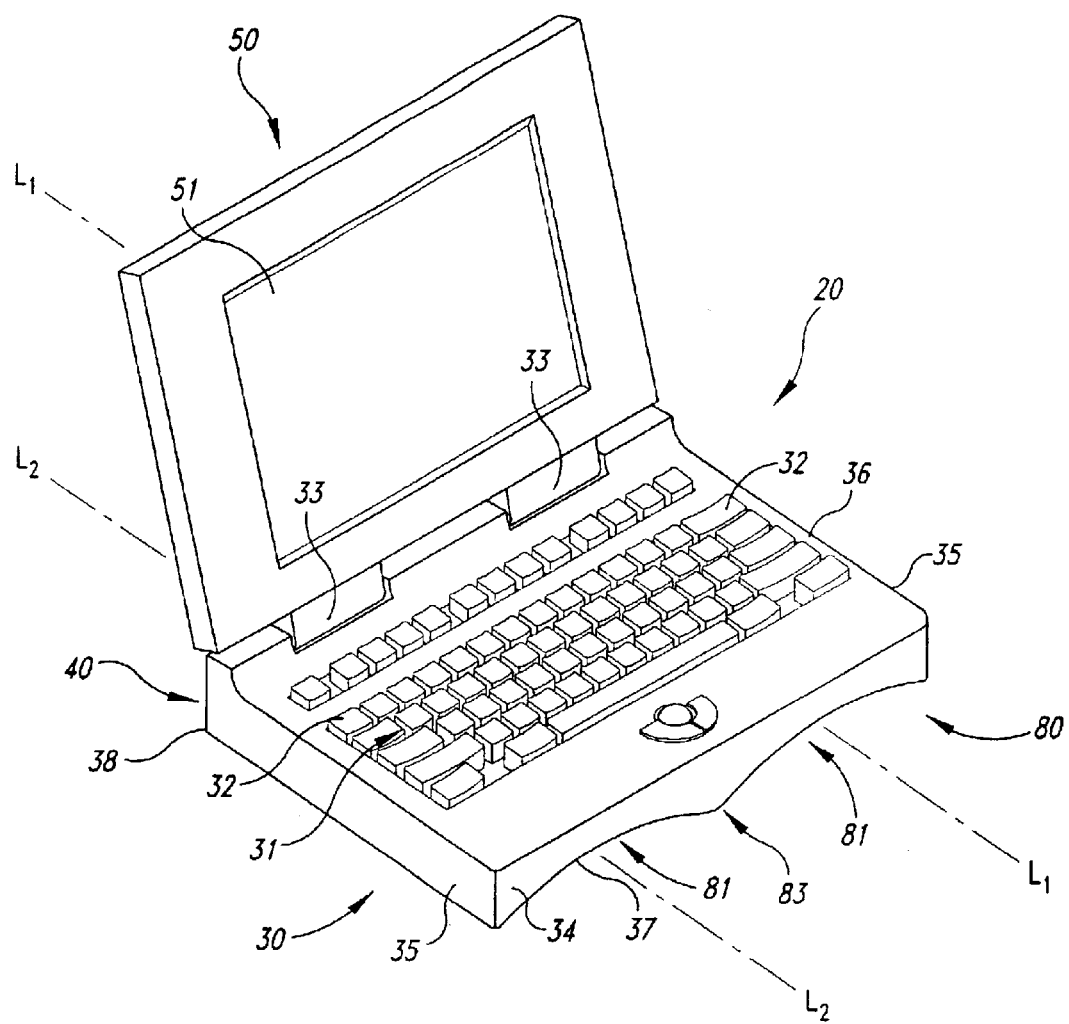
FIG. 1 is a top isometric view of a laptop computer having a base with a contoured lower surface in accordance with an embodiment of the invention.

FIG. 1 is a top isometric view of a laptop computer 20 having a base 30 coupled to a display housing 50 by a plurality of hinges 33. The base 30 may include a primary input device, such as a conventional keyboard 31 having a plurality of input keys 32, and the display housing 50 may include a display 51, such as a conventional liquid crystal display (LCD). When in use, the display housing 50 may be pivoted away from the base 30 to an operating or open configuration (shown in FIG. 1) so that both the display 51 and the keyboard 31 are accessible to a user (not shown). When the computer 20 is not in use, the computer may be folded for transport by pivoting the display housing 50 toward the base 30 and then securing the display housing 50 to the base 30 in a closed configuration.

The base 30 has a forward surface 34 facing the user, a rear surface 40 opposite the forward surface, and side surfaces 35 extending between the forward and rear surfaces. The keyboard 31 projects from an upper surface 36 of the base 30 to be accessible to the user when the laptop computer 20 is in the open configuration. The base 30 further includes a lower surface 80 opposite the upper surface 36 that is contoured to engage the user's legs when the laptop computer 20 is placed on the user's lap for operation.

Figure 2A:
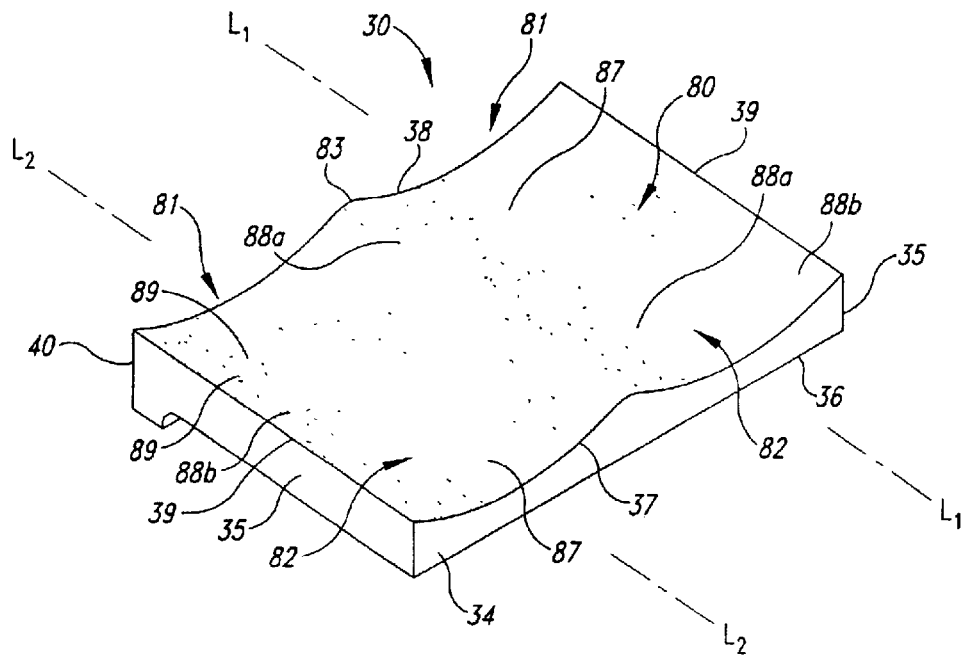
FIG. 2A is a top isometric view of the lower surface of the base shown in FIG. 1.

FIG. 2A is a top isometric view of the lower surface 80 of the base 30 shown in FIG. 1. Referring to FIGS. 1 and 2A, the lower surface 80 is contoured with two elongated depressions or troughs 81 that extend between the forward surface 34 and the rear surface 40 generally along upper leg axes $L_1$—$L_1$ and $L_2$—$L_2$. In this particular embodiment, the depressions 81 extend parallel or approximately parallel to side edges 39 of the lower surface 80, and the depressions 81 each span the lower surface 80 from a forward edge 37 to a rear edge 38 of the lower surface 80. Each depression 81 is generally concave relative to the lower surface 80 and includes a central region 87 between inner and outer side regions 88a and 88b. The central regions 87 and the side regions 88a, 88b are curved to correspond to the curvature of users' legs. The side regions 88a, 88b are thus smoothly contoured with the central regions 87 to define generally concave engaging surfaces 82 shaped to engage both the upper and side surfaces of users' legs. In the embodiment shown in FIG. 2A, the two inner side regions 88a are smoothly contoured with each other to define a ridge 83 between the depressions 81 that is convex relative to the lower surface 80. The ridge 83 is positioned to extend at least partially between a user's legs when the computer 20 is placed on the user's lap. In another embodiment shown in FIG. 2B, the ridge 83 and inner side regions 88a are eliminated from the base 130 such that the lower surface 80 has a single elongated depression 181 extending from the forward edge 37 to the rear edge 38.

Figure 2B:
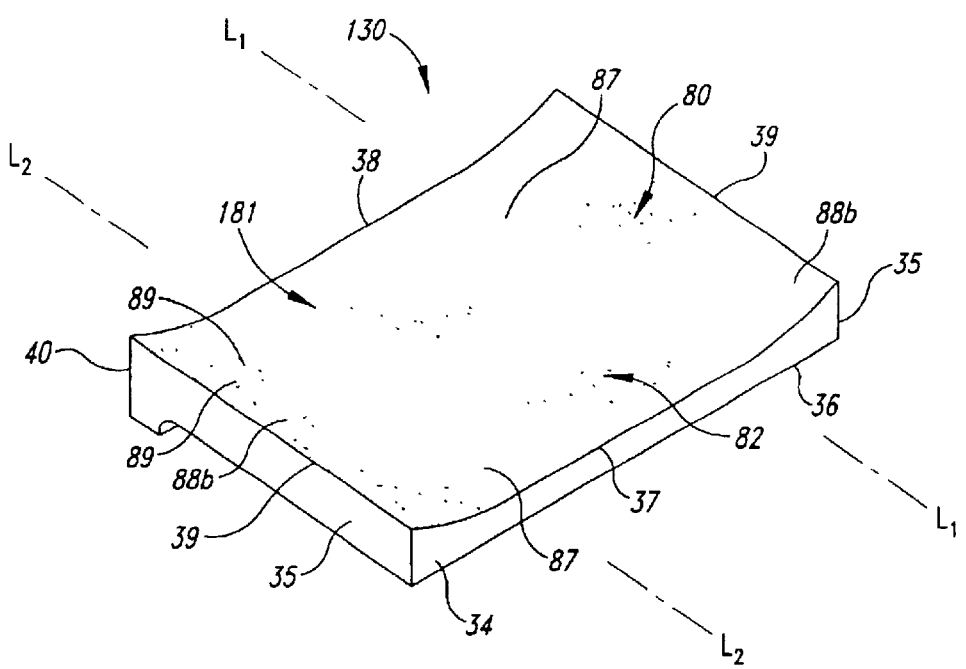
FIG. 2B is a top isometric view of a lower surface of a base in accordance with another embodiment of the invention.
Figure 2C:
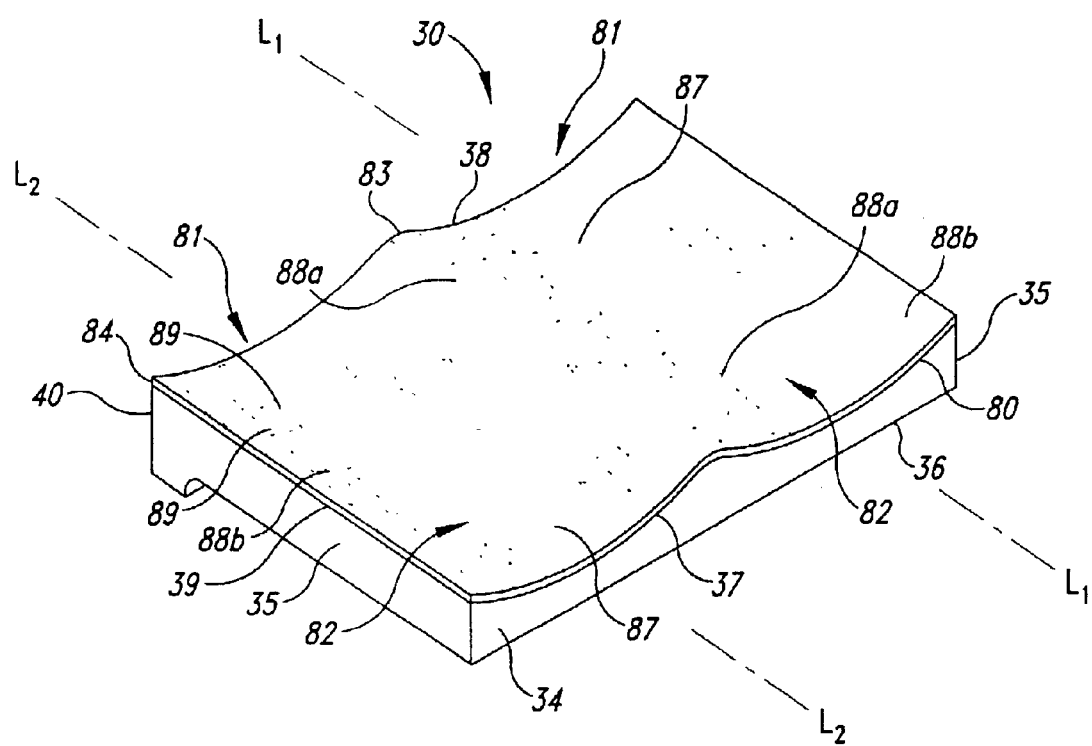
FIG. 2C is a top isometric view of a lower surface of a base in accordance with still another embodiment of the invention.

In the base 30 shown in FIGS. 1 and 2A–2B, the contoured lower surface 80 is shaped to engage both the upper and side surfaces of the user's legs. Accordingly, compared to conventional computer bases with flat lower surfaces, the lower surface 80 distributes the weight of the laptop computer 20 over a greater surface area of the user's legs to make the computer 20 more comfortable to operate. Additionally, because the contoured lower surface 80 shown in FIGS. 1 and 2A–B has side regions 88a and/or 88b shaped to engage the sides of the user's legs, the base 30 resists relative lateral motion between the user's legs and base 30. The contoured lower surface 80, therefore, may reduce the likelihood that the laptop computer 20 will slide around on the user's lap.

As shown in FIGS. 2A–2B, the lower surface 80 may be textured to increase the friction between the base 30 and the user's legs. For example, a plurality of roughness elements 89 may be distributed across the lower surface 80 to further resist relative lateral motion between the base 30 and the user's legs. The roughness elements 89 may be small projections projecting away from the engaging surface 82 and they may be integral with the lower surface 80 of the base 30. In another embodiment, shown in FIG. 2C, the roughness elements 89 are distributed over a separate roughness layer 84 that is separately attached to the lower surface 80. The roughness layer 84 may comprise a resilient, flexible material that conforms to the shape of the lower surface 80, and it may be attached to the lower surface 80 with adhesives or other suitable means. In one aspect of this embodiment, the roughness layer 84 may be composed of a skid-resistant material. For example, the roughness layer 84 may be composed of rubber or any conventional synthetic material having a relatively high friction coefficient.

An advantage of the roughness elements 89 and the skid-resistant roughness layer 84 is that they may further reduce the amount of relative motion between the laptop computer 20 and the user's legs. A further advantage of the roughness layer 84 shown in FIG. 2C, in addition to its skid-resistant qualities, is that a plurality of bases 30 may be manufactured without the roughness elements 89 and the roughness layer 84 may be added to selected bases during a subsequent manufacturing or retrofit process. Accordingly, the base 30 may include the roughness layer 84 as an option for users who prefer the roughness elements 89. Conversely, an advantage of the molded roughness elements 89 shown in FIGS. 2A–2B is that they may be relatively inexpensive to manufacture.

Figure 3:
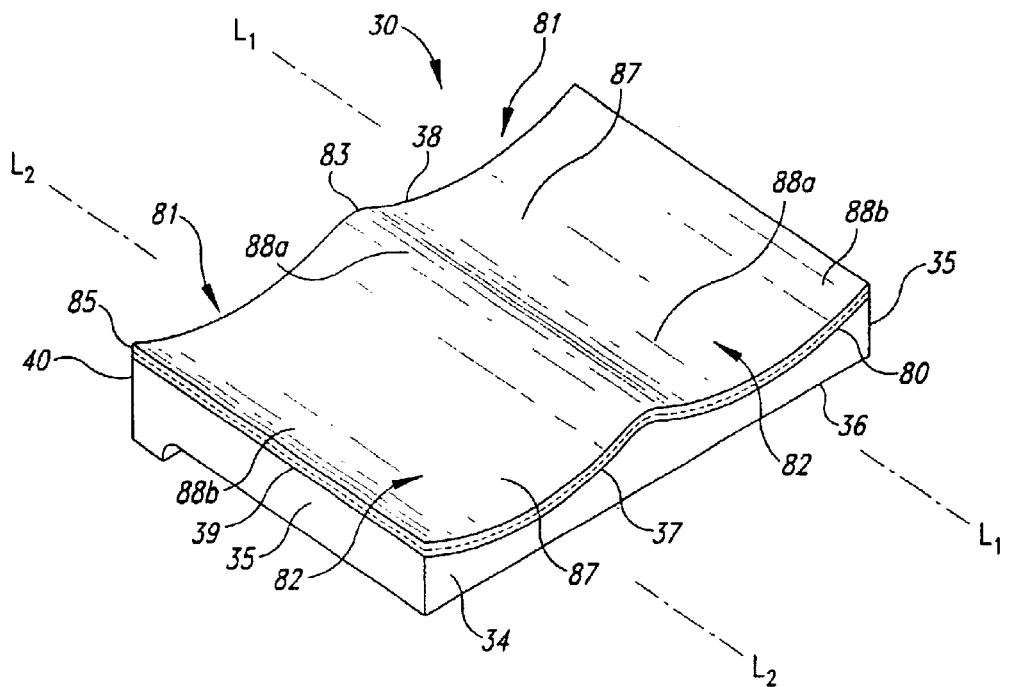
FIG. 3 is a top isometric view of a lower surface of another base in accordance with yet another embodiment of the invention.

FIG. 3 is a top isometric view of the base 30 having a compressible layer 85 attached to the lower surface 80. The compressible layer 85 is resilient and deforms under loads between an uncompressed position (solid lines in FIG. 3) and a compressed position (dashed lines) when the base 30 is placed on the user's lap. Accordingly, the compressible layer 85 may be composed of many commercially available materials, such as a synthetic high-density foam. In a further aspect of this embodiment, the compressible layer 85 may include roughness elements 89 (FIGS. 2A–2C) and/or may have skid-resistant characteristics, as discussed above with reference to FIG. 2C.

An advantage of the compressible layer 85 is that it may make the base 30 more comfortable when positioned on the user's lap. A further advantage is that the compressible layer 85 may compress in a non-uniform manner to increase the contact area between the base 30 and the user's legs. For example, when the compressible layer 85 is in the compressed position, it may compress more in the central regions 87 than the side regions 88a and 88b because the central regions 87 are generally normal to the load path between the base 30 and the user's legs. As the central regions 87 of the compressible layer 85 compress, the side regions 88a and 88b may be drawn into closer contact with the user's legs, distributing the weight of the base 30 more evenly over the surfaces of the user's legs and further inhibiting relative lateral motion between the base 30 and the user's legs.

Figure 4A:
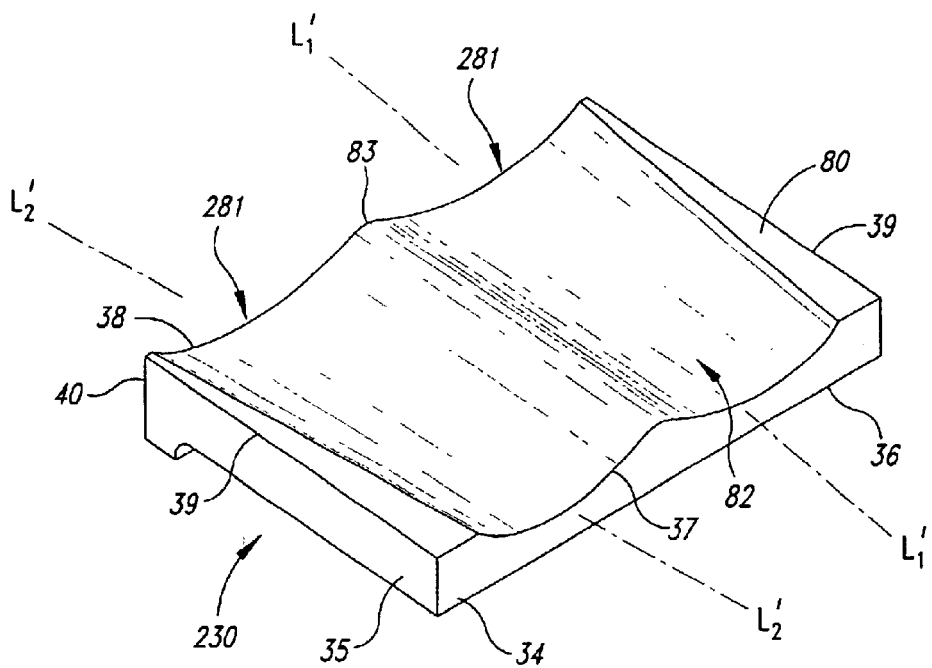
FIG. 4A is a top isometric view of a lower surface of a base having diverging depressions in accordance with another embodiment of the invention.
Figure 4B:
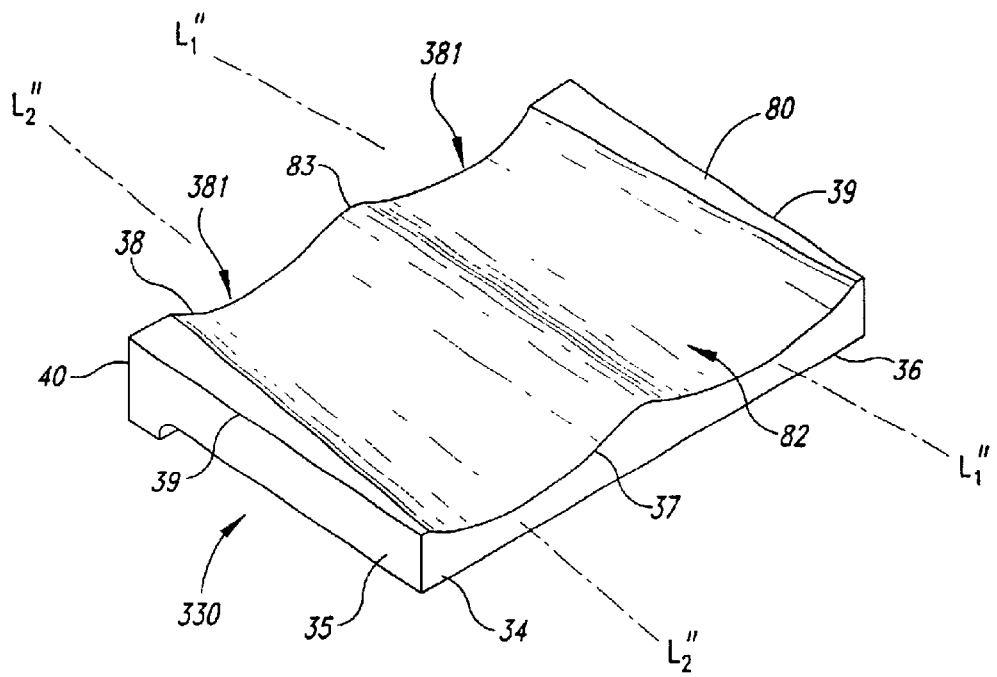
FIG. 4B is a top isometric view of a lower surface of a base having converging depressions in accordance with still another embodiment of the invention.

FIG. 4A is a top isometric view of the lower surface 80 of a base 230 in accordance with another embodiment of the invention. As shown in FIG. 4A, the depressions 281 in the lower surface 80 extend generally along leg axes $L'_1$—$L'_1$ and $L'_2$—$L'_2$ to diverge apart from one another as they extend from the forward surface 34 to the rear surface 40 of the base 230. The diverging depressions 281 may more comfortably fit on the laps of users who prefer to separate their legs slightly while supporting the base 230. In another embodiment, shown in FIG. 4B, the depressions 381 extend along leg axes $L''_1$—$L''_1$ and $L'_2$—$L''_2$ to converge toward one another as they extend from the forward surface 34 to the rear surface 40 of the base 330. The base 330 shown in FIG. 4B may accordingly be more comfortable for users who prefer to keep their legs tightly together when supporting the base 330 on their laps.

Figure 5:
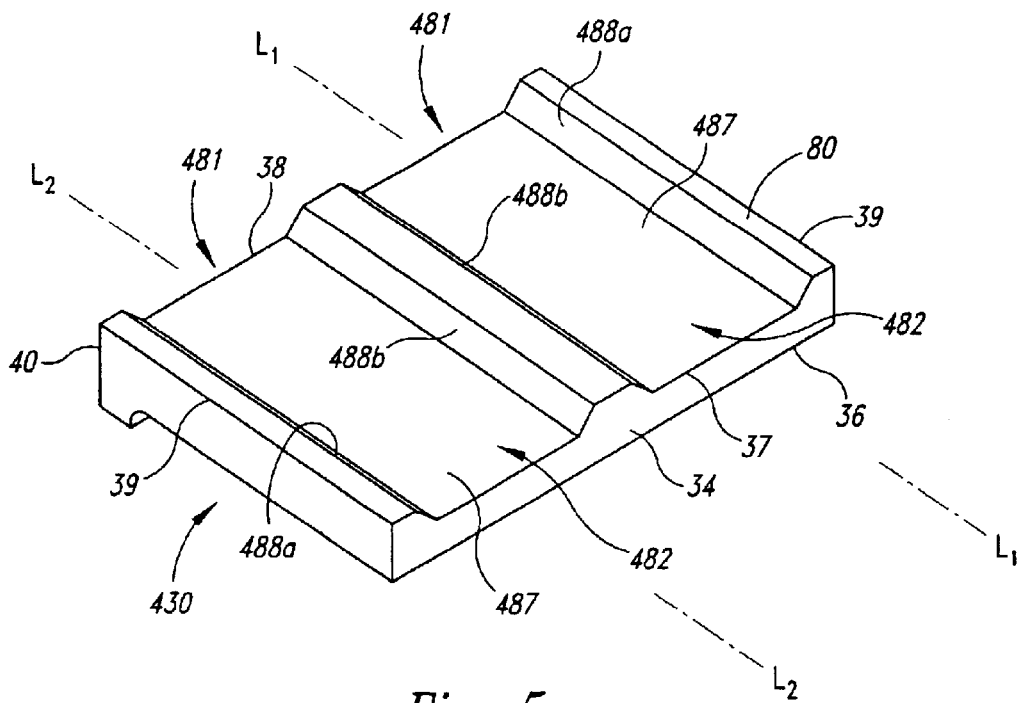
FIG. 5 is a top isometric view of a lower surface of a base having depressions with flat surfaces in accordance with yet another embodiment of the invention.

FIG. 5 is a top isometric view of the lower surface 80 of a base 430 having depressions 481 with flat engaging surfaces 482. Accordingly, both the central regions 487 and side regions 488a and 488b of the engaging surfaces 482 are flat. In another embodiment (not shown), the central regions 487 are flat and the side regions 488a, 488b are curved, and in still another embodiment, the central regions are curved and the side regions 488a, 488b are flat. As shown in FIG. 5, the flat outer side regions 488a of the engaging surfaces 482 may be more nearly vertical than the curved outer regions 88a shown in FIGS. 1–4B. Accordingly, an advantage of the flat outer side regions 488a is that they may be more nearly perpendicular to the sides of the user's legs and, as a result, may more effectively resist relative lateral motion between the user's legs and the base 430. Conversely, an advantage of the curved engaging surfaces 82 shown in FIGS. 1–4B is that they may be more comfortable because they evenly distribute the weight of the base 30 over the user's legs.

Figure 6:
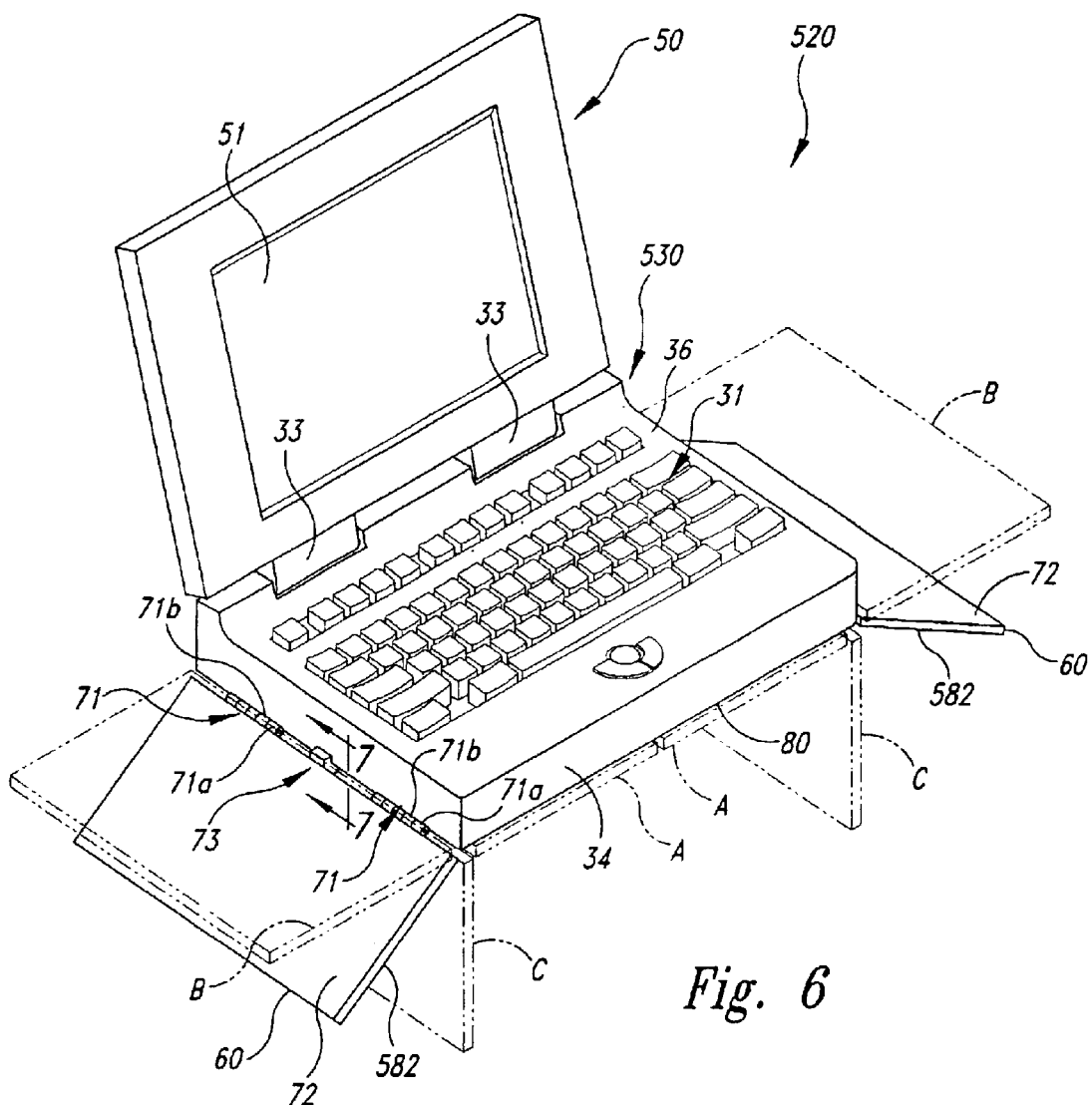
FIG. 6 is a top isometric view of a laptop computer having pivotable support members coupled to the base in accordance with still another embodiment of the invention.

FIG. 6 is a top isometric view of another laptop computer 520 having a base 530 with support members 60 movably attached to the base 530 to support the base 530 on the user's lap. In one embodiment, the support members 60 are flat panels having a generally flat upper surface 72 and a generally flat engaging surface 582 opposite the upper surface 72. In another embodiment described in greater detail below with reference to FIG. 10, the engaging surface 582 of each support member 60 may be contoured. In the embodiment shown in FIG. 6, the support members 60 are pivotally attached to the base 530 with hinges 71 at the lower surface 80 of the base 530 to pivot relative to the base 530 between a stowed position A (shown in dashed lines) and a variety of unstowed positions.

When each support member 60 is in the stowed position A, the engaging surfaces 582 are folded against the lower surface 80 of the base 530. Accordingly, each of the support members 60 may have a width that is approximately one-half or less than one-half a width of the base 530 so that the support members do not overlap each other when in the stowed position A. In another embodiment, discussed in greater detail below with reference to FIG. 8, the support members 60 may overlap each other when in the stowed position A.

To rest the computer 520 on a user's lap, the support members 60 may be moved from the stowed position A to a first unstowed position B (shown by horizontal dashed lines) such that the support members 60 extend horizontally away from the base 530. When the support members 60 are in the first unstowed position B, the engaging surfaces 582 are approximately coplanar with the lower surface 80 of the base 530 so that the support members 60 and base 530 form a relatively large, flat platform for supporting the laptop computer 520 on the user's lap. Unlike conventional laptop bases, therefore, the base 530 allows the user to still support the computer 520 on the user's lap while the user's legs are in a more ergonomic position. For example, the support members 60 continue to support the laptop computer 520 on the user's lap even when the user has a relatively wide leg stance such that the user's legs are not positioned directly beneath the keyboard 31 and the display 51.

The support members 60 may also be positioned in a second unstowed position C (shown by vertical dashed lines). When the support members 60 are in the second unstowed position C, the user's legs may press against the engaging surfaces 582. An advantage of the support members 60 when in the second unstowed position C is that they may make the laptop computer 520 more comfortable to operate because users may not need to squeeze their legs together. For example, with the support members 60 in the second unstowed position C, users may relax their legs against the engaging surfaces 582 because the support members 60 keep their legs centered beneath the base 530 to support the laptop computer 520. This may be particularly advantageous when the laptop computer 520 is used in cramped environments where users wish to keep their legs relatively close together but also wish to be more relaxed while supporting the computer 520. Yet another advantage of the support members 60 when in the second unstowed position C is that they may engage a substantial portion of the sides of the user's legs and may accordingly resist relative lateral motion between the laptop computer 520 and the user's legs, reducing the likelihood that the laptop computer will fall from the user's lap.

Figure 7:
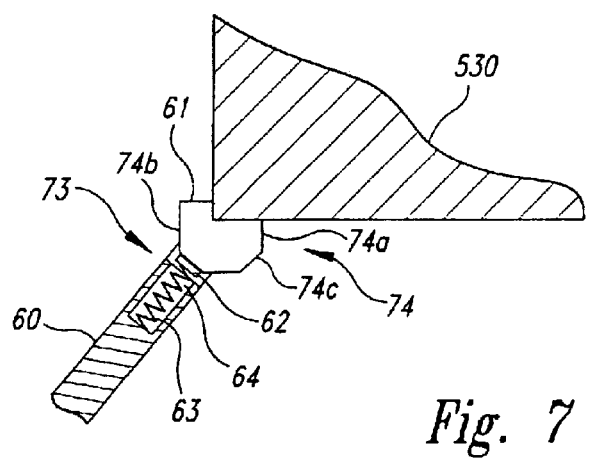
FIG. 7 is a cross-sectional view of a portion of a support member and the base taken substantially along line 7—7 of FIG. 6.

In addition to the unstowed positions B and C discussed above, the support members 60 may be positioned in any number of other unstowed positions, such as the position indicated in solid lines in FIG. 6. To hold the support members 60 relative to the base 530 in any of the stowed or unstowed positions, a locking device 73 may releasably fix the support members 60 to the base 530. FIG. 7 is a cross-sectional view of a portion of the base 530 and one support member 60 taken substantially along line 7—7 of FIG. 6 showing the details of one embodiment of the locking device 73. The locking device 73 may include a cam member 61 attached to the base 530, and a follower member 62 coupled to the support member 60 in an aperture 64. The follower member 62 is biased against the cam member 61 with a spring 63 or other type of biasing device. The cam member 61 may include a plurality of facets 74 that securely engage the follower member 62 when the support member 60 is in a selected position. For example, when the support member 60 is in the stowed position A, the follower member 62 engages facet 74a. Similarly, when the support member 60 is in the first unstowed position B or the second unstowed position C, the follower member 62 engages facet 74b or 74c, respectively.

In other embodiments, the positions of the cam member 61 and the cam follower 62 are interchanged so that the cam member 61 is attached to the support member 60 and the cam follower is attached to the base 530. In still further embodiments, other means may be used to secure the support member 60 at selected positions relative to the base 530. In one such embodiment, frictional forces in the hinges 71 are sufficient to secure the support member 60 in the selected position. For example, as shown in FIG. 6, the friction between one hinge component 71a (connected to the support member 60) and another hinge component 71b (connected to the base 530) is sufficient to maintain the support member in any of the stowed or unstowed positions discussed above. At the same time, the frictional forces between the hinge components 71a, 71b can be overcome to move the support members 60 relative to the base 30 when necessary.

Figure 8:
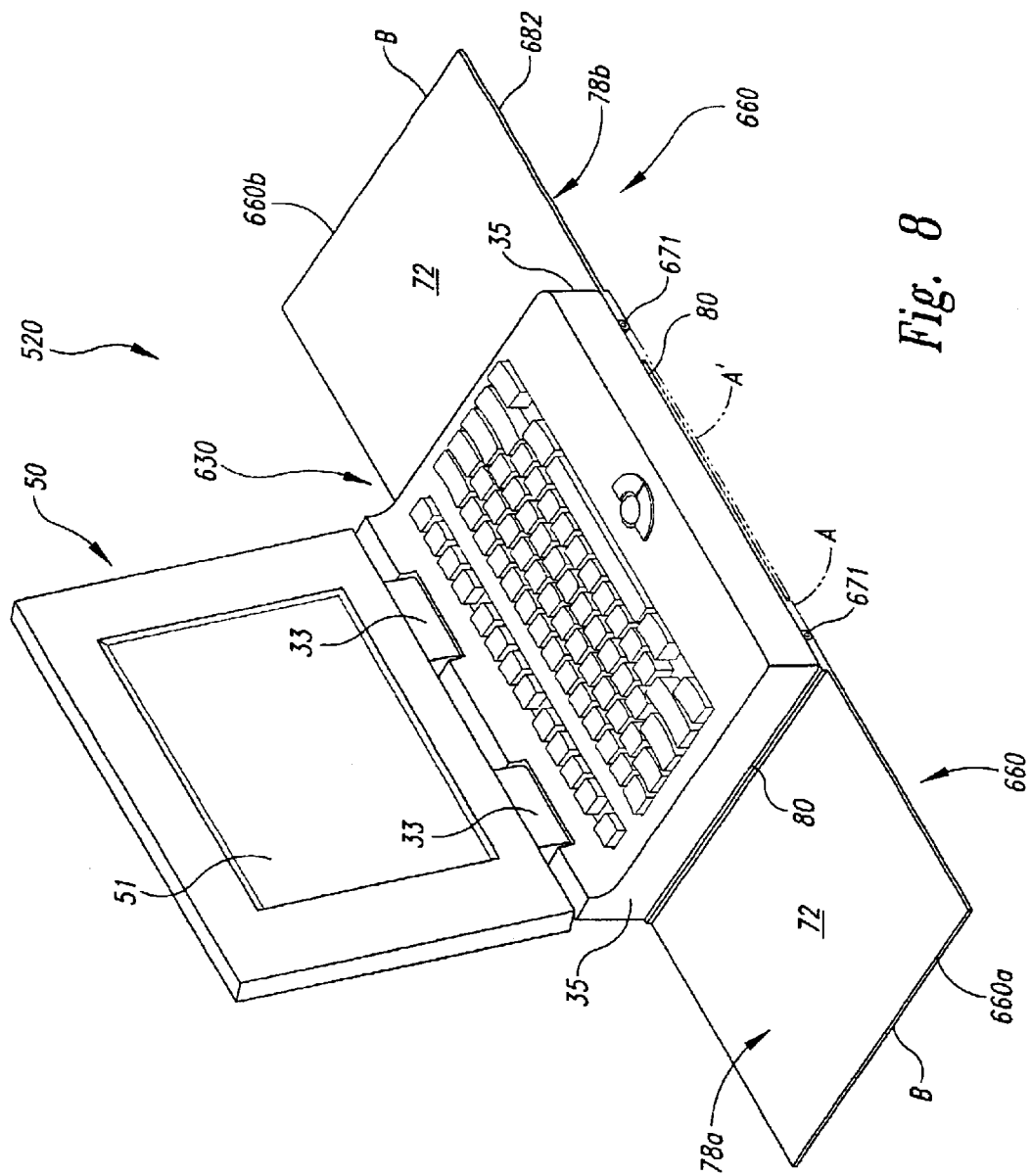
FIG. 8 is a top isometric view of a laptop computer having pivotable support members in accordance with another embodiment of the invention.

In other embodiments, the locking device 73 may include clamps, wing nuts, or other securing means (not shown) known to those skilled in the art. For example, as shown in FIG. 8, the lower surface 80 of the base 630 secures the support members 660 in the first unstowed position B (shown in solid lines) because the support members 660 are pivotally coupled to the base 630 with hinges 671 positioned inward of the sides 35. More specifically, when the support members 660 are in the first unstowed position B, the upper surfaces 72 of the support members 660 firmly engage the lower surface 80 of the base 630 to prevent the support members 660 from rotating upwardly beyond the first unstowed position B. An advantage of the locking arrangement shown in FIG. 8 is that it is simple and relatively inexpensive to construct. An advantage of the locking device 73 shown in FIGS. 6 and 7, however, is that it may be configured to secure the support members 560 in more than one unstowed position.

Returning to FIG. 8, the support members 660 overlap each other in the stowed position. Accordingly, the support members 660 include a left support member 660a having a recessed portion 78a in its upper surface 72, and a right support member 660b having a recessed portion 78b in its engaging surface 682. When the support members 660 are stowed, the left support member 660a is folded to its stowed position A and then the right support member 660b is folded to its stowed position A' so that the recessed portion 78b of the right support member 660b nests against the recessed portion 78a of the left support member 660a. An advantage of the overlapping support members 660 is that they may have a width that is greater than half the width of the base 630 to form a larger, more stable support platform for the base 630. This advantage may be particularly important where, as shown in FIG. 8, the support members 660 are coupled to the base inward of the side surfaces 35. However, in another embodiment, the overlapping support members 660 may be advantageously coupled to the ends of the base 630 adjacent to the side surfaces 35 (as is generally shown in FIG. 6) to provide the base with a very large, stable support platform.

Figure 9:
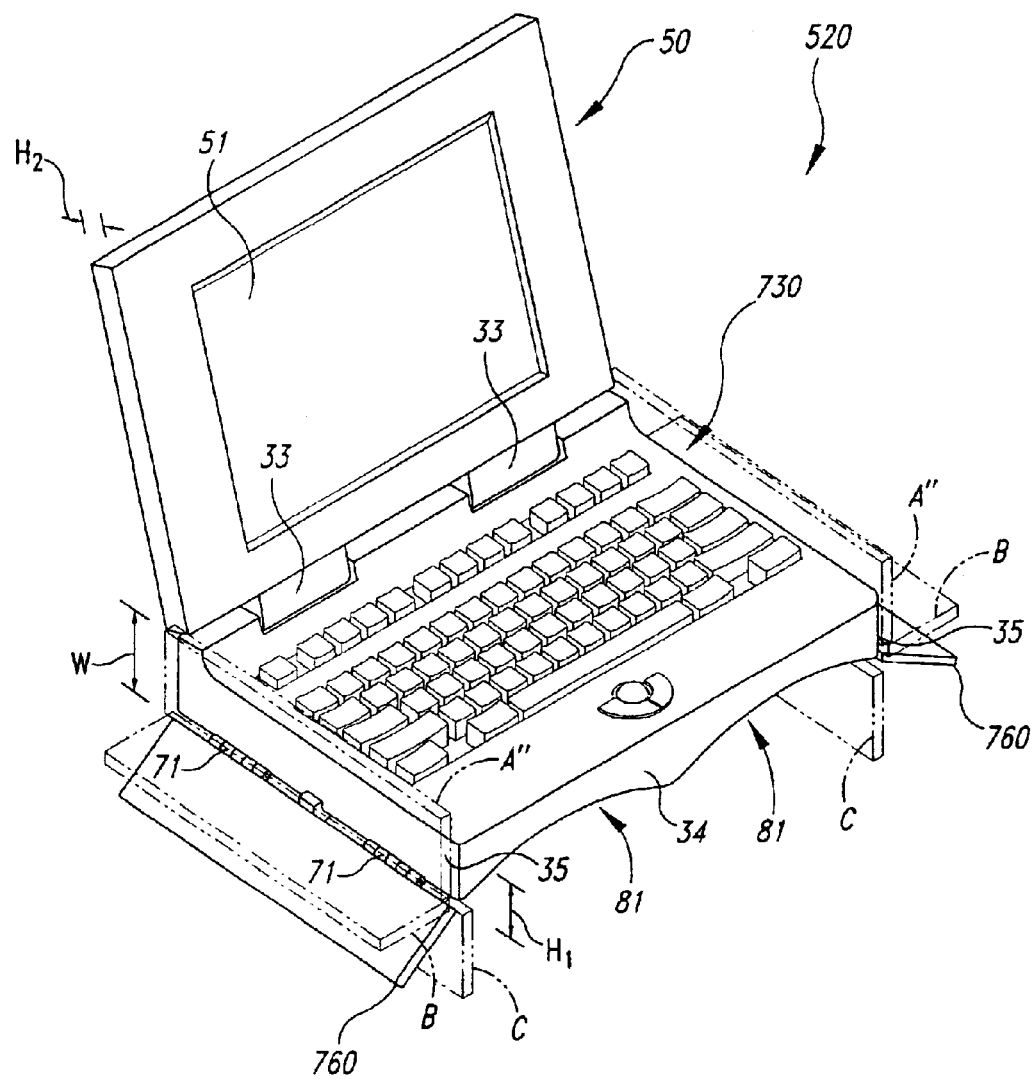
FIG. 9 is a top isometric view of a laptop computer having pivotable support members in accordance with still another embodiment of the invention.

FIG. 9 is a top isometric view of the laptop computer 520 having the base 730 and a plurality of support members 760 pivotally attached to the sides 35 of the base 730 in accordance with another embodiment of the invention. Each of the support members 760 may be folded upwardly against a corresponding side surface 35 of the base 730 when in a stowed position A" (shown in dashed lines). The support members 760 may accordingly width W that is less than or equal to the combined heights $H_1$ of the base 730 and $H_2$ of the display housing 50 when the display housing 50 is folded down against the base 730 in the closed configuration. Each support member 760 may be moved to first and second unstowed positions B and C in substantially the same manner as discussed above with reference to FIG. 6.

As shown in FIG. 9, the lower surface 80 of the base 730 may include depressions 81 that engage the user's legs in substantially the same manner as discussed above with reference to FIGS. 1–4B. When the support members 760 are moved to the second unstowed position C, the support members 760 and the depressions 81 together engage a relatively large portion of both the upper and side surfaces of the user's legs to distribute the weight of the laptop computer 520 relatively uniformly over the user's legs. In addition, when the support members 760 are in the second unstowed position C, they engage the sides of the user's legs to inhibit relative lateral motion between the laptop computer 520 and the user's legs. Alternatively, the user may position the support members 60 in the first unstowed position B allowing the user to have a wider leg stance and still support the base 730, as discussed above with reference to FIG. 6.

In addition to the contoured lower surface 80 shown in FIG. 9 in combination with the upwardly folding support members 760, other embodiments may use other types of support members. For example, the base 630 may have a contoured lower surface 80 and the support members 60 that fold against or proximate to the lower surface in a manner generally similar to that shown in FIG. 6.

Figure 10:
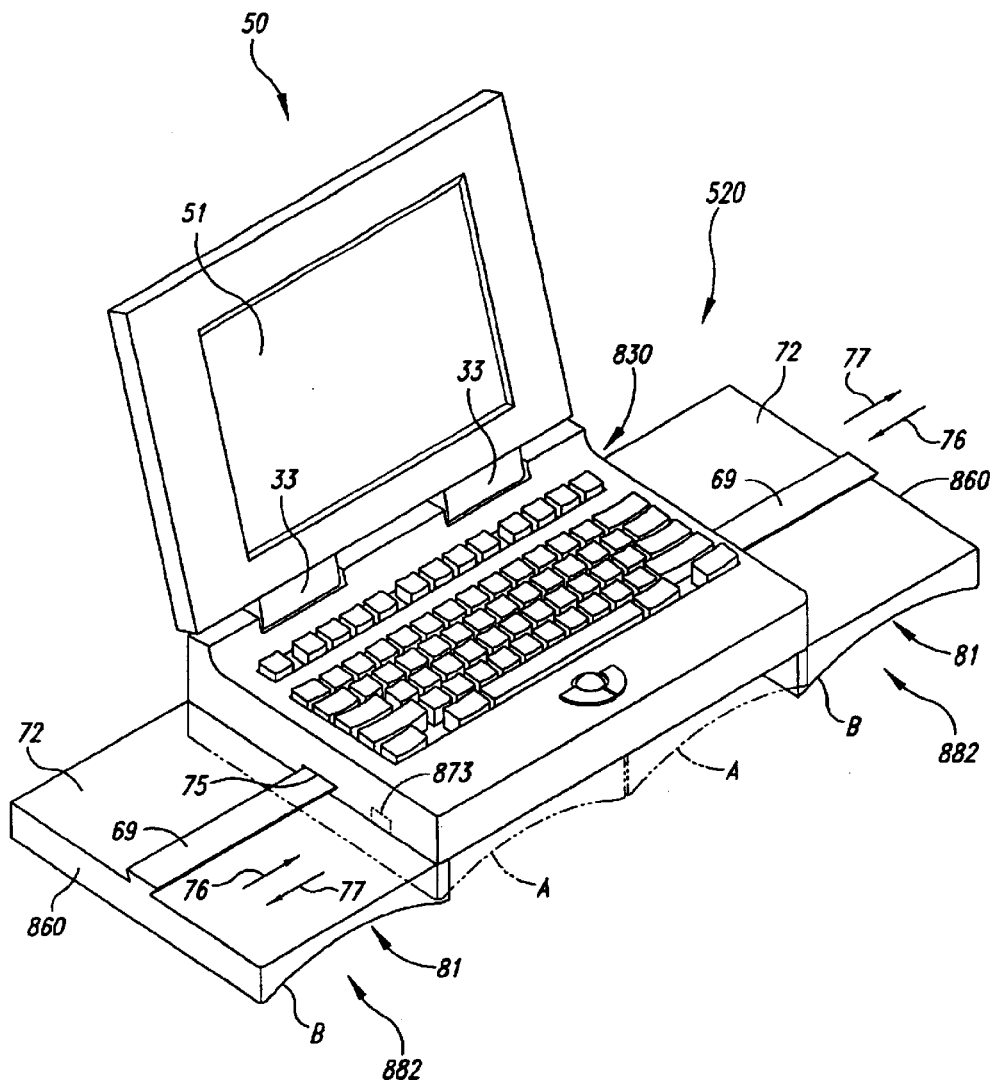
FIG. 10 is a top isometric view of a laptop computer having slidable support members in accordance with yet another embodiment of the invention.

FIG. 10 is a top isometric view of the laptop computer 520 having a base 830 with support members 860 that slide relative to the base 830 in accordance with another embodiment of the invention. As shown in FIG. 10, each support member 860 has a guide rail 69 extending along its upper surface 72. The base 830 accordingly may have a corresponding channel 75 configured to receive the guide rails 69 and allow the guide rails to slide with respect to the base 830 (arrows 76 and 77). A user, therefore, may move the support members 860 from the stowed position A (shown in dashed lines) to the unstowed position B (shown in solid lines), or to any intermediate position. In one embodiment, the guide rails 69 fit snugly within the channel 75 such that the friction between the guide rails 69 and the channel 75 is sufficient to secure the support members 860 in a variety of selected positions. In other embodiments, other securing means may be used to releasably secure the support members 860 in the selected positions. For example, in one embodiment, a locking device 873 (shown schematically) is operatively coupled to the base 830 and one of the support members 860 to secure the support member 860 in the stowed position A and/or the unstowed position B.

As shown in FIG. 10, each support member 860 may have a contoured engaging surface 882 with a depression 81 configured in a manner similar to the depressions discussed above with reference to FIGS. 1–4B. In operation, the laptop computer 520 may be placed on the user's lap with the support members 860 in the stowed position to operate as discussed above with reference to FIGS. 1–4B. Alternatively, the user may move the support members 860 outwardly away from the base 830 to support the laptop computer 520 with a wider leg stance. An advantage of the support members 860 shown in FIG. 10 is that they may be placed in any number of intermediate positions between the stowed position A and the fully extended unstowed position B. Accordingly, the laptop computer 520 may be more versatile and easier to use because it may be configured to suit the preferences of a wide variety of users and/or the variable preferences of a single user.

Figure 11:
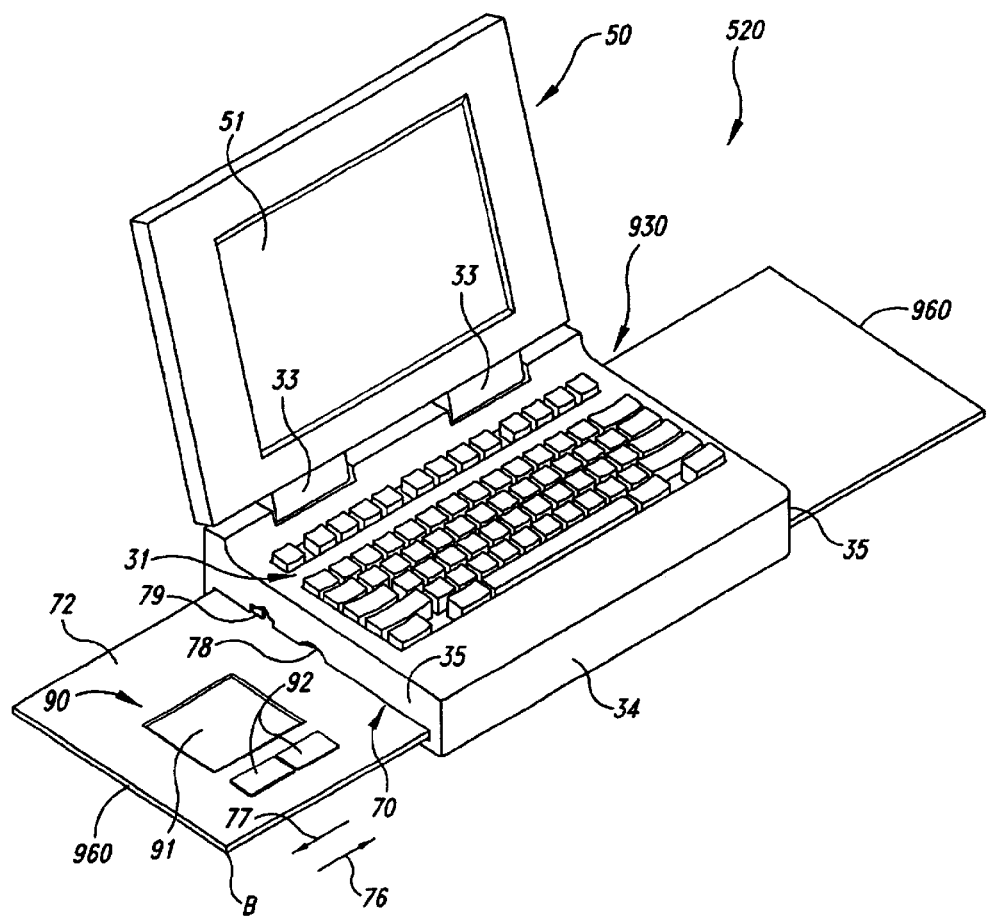
FIG. 11 is a partially cut away top isometric view of a laptop computer having slidable support members and a secondary input device in accordance with still another embodiment of the invention.

FIG. 11 is a top isometric view of a laptop computer 520 having support members 960 that are slidably received in slots 70 in the side surfaces 35 of the base 930. Each support member 960 may be moved out of the corresponding slot 70 (indicated by arrow 77) to the unstowed position B, or into the slot 70 (indicated by arrow 76) to the stowed position (not shown). A stop 79 may project from the upper surface 72 of each support member 960 to engage an inner face of the side surface 35 when the support member 960 is in the unstowed position B for preventing the support member 960 from being completely withdrawn from the slot 70. Each side surface 35 of the base 930 may include a finger aperture 78 that allows the user to easily grip each support member 960 when the support member 960 is in the stowed position for pulling the support member 960 from the stowed position to the unstowed position B.

As shown in FIG. 11, the support member 960 may include a secondary input device 90 in the upper surface 72. The secondary input device 90 may include a touch pad 91 and switches 92, a roller ball (not shown), or other types of devices that transmit input commands to the laptop computer 520. The secondary input device 90 may accordingly be coupled to the laptop computer 520 with a cable (not shown) or other communication means. The secondary input device 90 is accordingly accessible when the support member 960 is in the unstowed position, but it is inaccessible when the support member 960 is in the stowed position. An advantage of the support member 960 having the secondary input device 90 is that the secondary input device is spaced apart from the keyboard 31. A further advantage of the support member 960 and the base 930 shown in FIG. 11 is that the secondary input device 90 is protected from incidental contact and other hazards when the support member 960 is in the stowed position.

In other embodiments (not shown) the secondary input device 90 may be positioned in the upper surface 72 of other support members. For example, the secondary input device 90 may be positioned in the upper surface 72 of the support member 860 shown in FIG. 10, or in the upper surface of any of the support members shown in FIGS. 6–9. An advantage of the input device 90 when positioned in the support member 960 shown in FIG. 11, as compared with the support member 860 shown in FIG. 10, is that the support member 960 has more surface area for the input device because it does not have a guide rail 69. An advantage of the input device 90 when positioned in the support member 960 shown in FIG. 11, as compared with the support members shown in FIGS. 6–9, is that the input device 90 is protected within the base 930 when the support member 960 is in the stowed position.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A laptop computer base, comprising:
   a base housing having an upper surface with a keyboard and a lower surface opposite the upper surface; and
   first and second support members coupled to the base housing, each of the first and second support members being movable relative to the base housing between a stowed position and an unstowed position, the first support member having an engaging surface that extends outwardly away from the base housing when the first support member is in its unstowed position, the second support member having an engaging surface that extends outwardly away from the base housing opposite the first support member when the second support member is in its unstowed position, the first and second support members increasing a widthwise dimension of the base housing to provide more surface area for engaging a support surface.

2. The base of claim 1 wherein the lower surface of the base housing is approximately coplanar with the engaging surfaces of the support members when the support members are in the unstowed positions.

3. The base of claim 1 wherein the base housing has a first aperture sized and shaped to slidably and removably receive at least a portion of the first support member, the base housing further having a second aperture sized and shaped to removably receive at least a portion of the second support member, the first support member being slidable into and out of the first aperture, the second support member being slidable into and out of the second aperture.

4. The base of claim 1 wherein the lower surface of the base housing is generally flat, and the engaging surface of the first support member is generally flat, the engaging surface of the first support member being positioned adjacent the lower surface of the base housing when the first support member is in the stowed position.

5. The base of claim 1 wherein the first support member has an upper surface opposite the engaging surface, the upper surface of the first support member facing upward and the engaging surface of the first support member being approximately parallel to the lower surface of the base housing when the first support member is in the unstowed position.

6. The base of claim 1 further comprising a locking device operatively coupled to the base housing and the first support member to secure the first support member in at least one of the stowed and unstowed positions.

7. The base of claim 6 wherein the base housing has a lower surface, the first support member has a top surface opposite the engaging surface thereof, and the locking device comprises a generally flat portion of the lower surface positioned to engage a generally flat portion of the top surface of the first support member when the first support member is in the unstowed position and the top surface thereof is approximately parallel to the lower surface of the base housing.

8. The base of claim 6 wherein the locking device comprises a hinge having a first portion connected to the base housing and a second portion connected to the first support member, the first portion being frictionally coupled to the second portion to allow the first support member to pivot relative to the base housing when the user engages the first support member and moves the first support member between the stowed and unstowed positions, the first and second portions securing the first support member in at least one of the stowed and unstowed positions when the user releases the first support member.

9. The base of claim 6 wherein the locking device comprises a cam member coupled to one of the base housing and the first support member and a follower member coupled to the other of the base housing and the first support member, one of the cam member and the follower member being biased toward the other of the cam member and the follower member, the cam member having at least one flat surface positioned to engage a corresponding flat surface of the follower member when the first support member is in a selected position relative to the base housing.

10. The base of claim 1 wherein the first and second support members are slidably connected to the base housing and are slidable relative to the base housing between their stowed and unstowed positions.

11. The base of claim 10 wherein the first support member has a guide rail connected and the base housing has a channel configured to slidably receive the guide rail.

12. The base of claim 10 wherein the engaging surface of the first support member has a first concave depression to receive an upper surface of one of the legs of a user and the engaging surface of the second support member has a second concave depression to receive an upper surface of the other of the legs of the user.

13. The base of claim 1, wherein the first support member has an upper surface opposite the engaging surface, the upper surface having an input device operatively coupled to the base housing to transmit input commands thereto.

14. The base of claim 13 wherein the input device comprises a touch-sensitive surface.

15. The base of claim 13 wherein the first support member is slidably connected to the base housing and slidable relative to the base housing between its stowed and unstowed positions.

16. The base of claim 1 wherein the first support member has an upper surface opposite the engaging surface, the upper surface being sized and shaped to support a computer mouse thereon when the first support member is in its unstowed position.

17. The base of claim 1 wherein the engaging surface of the first support member has a first concave depression to receive an upper surface of one of the legs of a user and the engaging surface of the second support member has a second concave depression to receive an upper surface of the other of the legs of the user.

18. The base of claim 1 wherein the first and second support members are pivotably connected to the base housing.

19. The base of claim 1 wherein the engaging surface of the first support member is generally flat and approximately perpendicular to the lower surface of the base housing when the first support member is in the unstowed position to engage a side of a leg of a user.

20. The base of claim 1 wherein the base housing has a side surface extending between the upper and lower surfaces, and the first support member has a generally flat upper surface opposite the engaging surface positioned adjacent the side surface when the first support member is in the stowed position.

21. The base of claim 1 wherein the lower surface of the base housing has a first width and the first support member has a second width when in the stowed position that is approximately half the first width.

22. The base of claim 1 wherein the lower surface of the base housing has a first width and the first support member has a second width when in the stowed position that is less than half the first width.

23. The base of claim 1 wherein the lower surface of the base housing has a first width and the first and second support members each have a second width when in the stowed position that is greater than half the first width.

24. The base of claim 23 wherein the engaging surface of the first support member is adjacent the lower surface when the first support member is in its stowed position and the second support member overlaps the first support member when the second support member is in its stowed position.

25. A laptop computer base, comprising:

a base housing having a first side with a first opening and a second side with a second opening, the second side being opposite the first side;

a first support member having a first portion slidably received in the first opening; and a second support member having a second portion slidably received in the second opening, each of the first and second support members being slidable relative to the base housing between a stowed position and an unstowed position, the first support member having an engaging surface extending away from the base housing to engage one leg of a user and restrict motion of the base housing relative to the one leg of the user when the first support member is in its unstowed position, the second support member having an engaging surface extending away from the base housing to engage the other leg of the user and restrict motion of the base housing relative to the other leg of the user when the second support member is in its unstowed position.

26. The base of claim 25 wherein the base housing has a lower surface approximately parallel with the engaging surfaces of the support members when the support members are in the unstowed positions.

27. The base of claim 25 wherein the first support member has an upper surface opposite the engaging surface, the upper surface being positioned within the first aperture when the first support member is in its stowed position.

28. The base of claim 25 wherein the first support member has an upper surface opposite the engaging surface, the upper surface having an input device operatively coupled to the base housing and accessible to the user when the first support member is in its unstowed position.

29. The base of claim 28 wherein the input device includes a touch-sensitive surface.

30. The base of claim 25 wherein the first support member has an upper surface opposite the engaging surface, the upper surface configured to support a computer mouse thereon when the first support member is in its unstowed position.

31. The base of claim 25 wherein the engaging surface of the first support member is concave to receive an upper surface of the one leg of the user and the engaging surface of the second support member is concave to receive an upper surface of the other leg of the user.

32. The base of claim 25 wherein the first portion of the first support member includes a guide rail and the first opening is configured to slidably receive the guide rail.

* * * * *

UNITED STATES PATENT AND TRADEMARK OFFICE
CERTIFICATE OF CORRECTION

PATENT NO. : 6,757,159 B2  
DATED : June 29, 2004  
INVENTOR(S) : Lynne Zarek et al.

It is certified that error appears in the above-identified patent and that said Letters Patent is hereby corrected as shown below:

<u>Column 8,</u>  
Line 4, "accordingly width" should be -- accordingly have a width --;

Signed and Sealed this

Twelfth Day of April, 2005

JON W. DUDAS  
*Director of the United States Patent and Trademark Office*